US012699200B1

(12) United States Patent
Olsson et al.

(10) Patent No.: US 12,699,200 B1
(45) Date of Patent: *Aug. 4, 2026

(54) UTILITY LOCATING SYSTEM WITH MOBILE BASE STATION

(71) Applicant: SeeScan, Inc., San Diego, CA (US)

(72) Inventors: Mark S. Olsson, La Jolla, CA (US);
Paul Wisecaver, San Diego, CA (US);
Austin Rutledge, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/922,314

(22) Filed: Oct. 21, 2024

Related U.S. Application Data

(63) Continuation of application No. 17/182,123, filed on Feb. 22, 2021, now Pat. No. 12,123,999, which is a continuation of application No. 16/390,967, filed on Apr. 22, 2019, now Pat. No. 10,935,686, which is a continuation of application No. 14/446,145, filed on Jul. 29, 2014, now Pat. No. 10,274,632.

(60) Provisional application No. 61/859,706, filed on Jul. 29, 2013.

(51) Int. Cl.
*G01V 3/16* (2006.01)
*G01S 19/00* (2010.01)

(52) U.S. Cl.
CPC ............... *G01V 3/16* (2013.01); *G01S 19/00* (2013.01)

(58) Field of Classification Search
None
See application file for complete search history.

(56) References Cited

U.S. PATENT DOCUMENTS

| | | | | |
|---|---|---|---|---|
| 9,465,129 | B1 * | 10/2016 | Olsson | G01V 3/15 |
| 9,488,747 | B2 * | 11/2016 | Olsson | G01V 3/12 |
| 9,523,788 | B1 * | 12/2016 | Olsson | G01V 3/165 |
| 12,007,471 | B2 * | 6/2024 | Fonts | G01S 13/88 |

* cited by examiner

*Primary Examiner* — Fekadeselassie Girma
(74) *Attorney, Agent, or Firm* — Steven C. Tietsworth, Esq.; Michael J. Pennington, Esq.

(57) ABSTRACT

Mobile base stations for use with one or more portable utility locators to aid in determining the location of a particular locator during operation and to receive information associated with the utility for storage and/or retransmission to other devices or systems are disclosed.

16 Claims, 10 Drawing Sheets

*Example Mobile Base Station Embodiment on Truck*

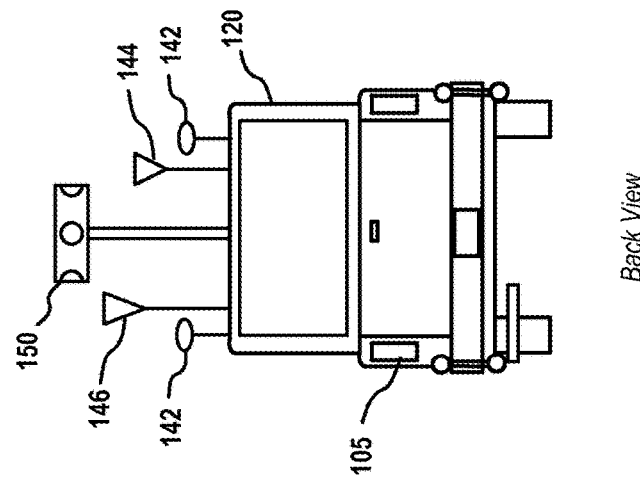
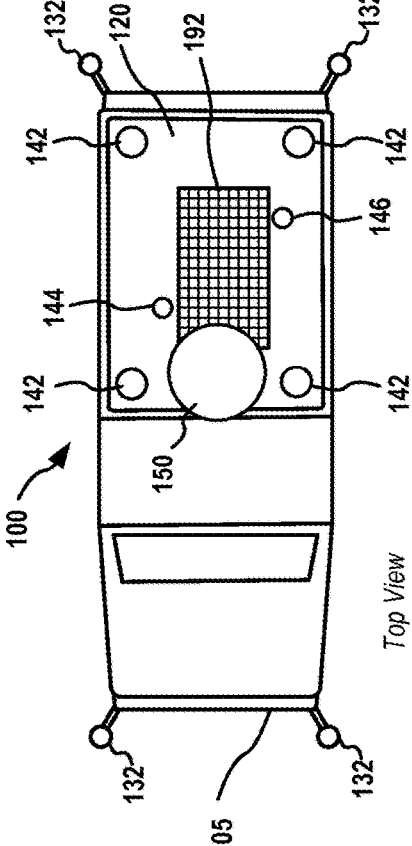
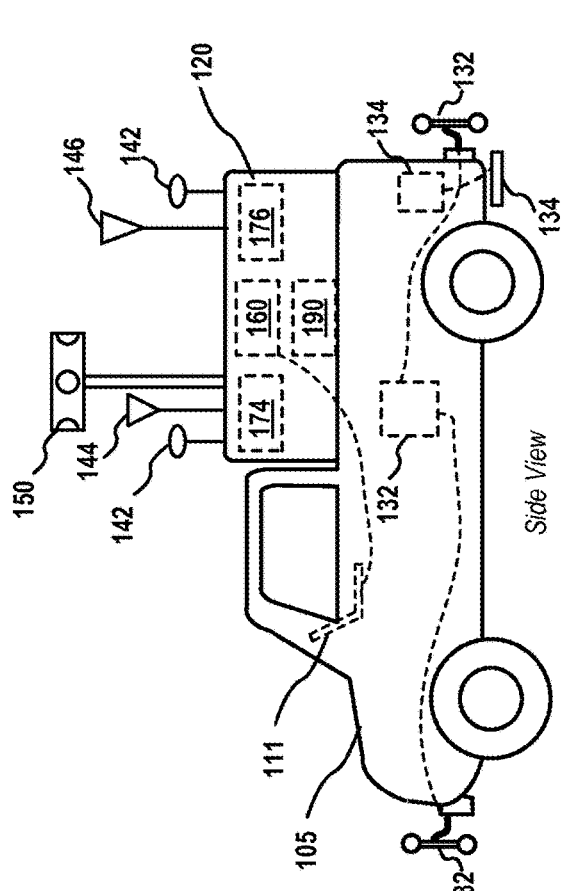
FIG. 1
*Example Mobile Base Station Embodiment on Truck*

*Example Mobile Base Station Embodiment on Trailer*

*Mobile Base Station Embodiment in Example Locate Operation*

Mobile Base Station Embodiment in Example Locate Operation

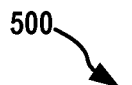
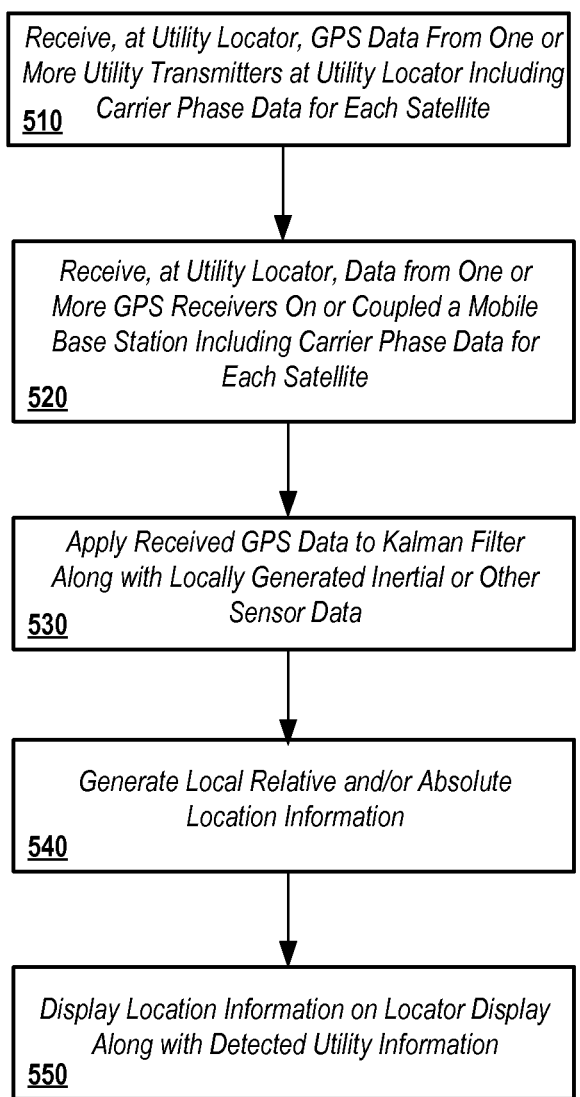
FIG. 5
*Example Embodiment of Processing of Data From Multiple GPS Receivers to Generate Enhanced Location Information in a Utility Locator*

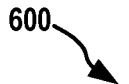

600

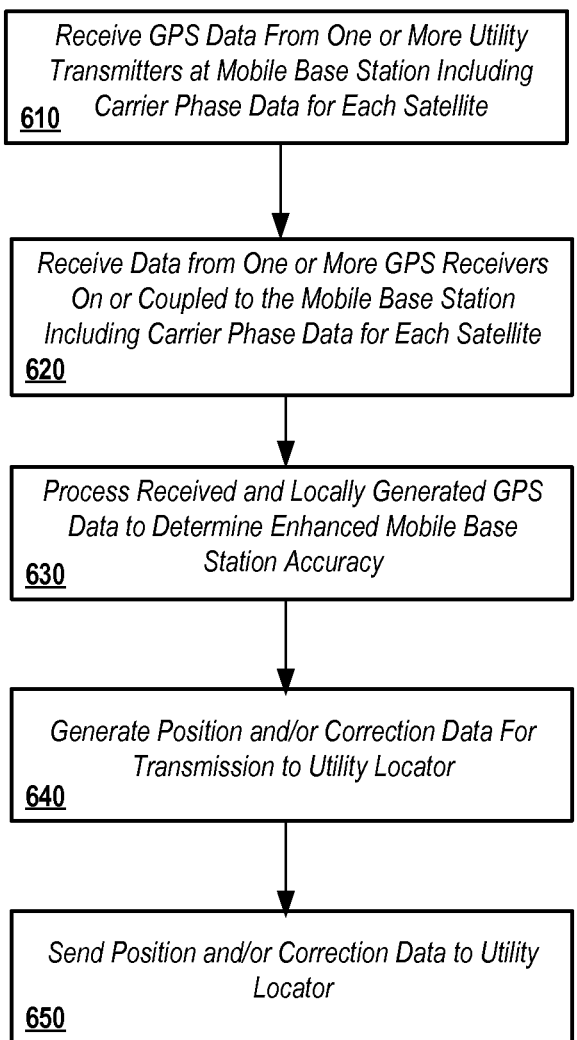

```
┌─────────────────────────────────────┐
│  Receive GPS Data From One or More   │
│   Utility Transmitters at Mobile     │
│   Base Station Including             │
│   610   Carrier Phase Data for       │
│         Each Satellite               │
└─────────────────────────────────────┘
                  │
                  ▼
┌─────────────────────────────────────┐
│  Receive Data from One or More GPS   │
│  Receivers On or Coupled to the      │
│  Mobile Base Station Including       │
│  Carrier Phase Data for Each         │
│  Satellite                           │
│  620                                 │
└─────────────────────────────────────┘
                  │
                  ▼
┌─────────────────────────────────────┐
│  Process Received and Locally        │
│  Generated GPS Data to Determine     │
│  Enhanced Mobile Base Station        │
│  Accuracy                            │
│  630                                 │
└─────────────────────────────────────┘
                  │
                  ▼
┌─────────────────────────────────────┐
│  Generate Position and/or Correction │
│  Data For Transmission to Utility    │
│  Locator                             │
│  640                                 │
└─────────────────────────────────────┘
                  │
                  ▼
┌─────────────────────────────────────┐
│  Send Position and/or Correction     │
│  Data to Utility Locator             │
│  650                                 │
└─────────────────────────────────────┘
```

FIG. 6

*Example Embodiment of Processing of Data From Multiple GPS Receivers to Generate Enhanced Location Information in a Utility Locator*

*Example Utility Locator Embodiment Details*

*Example Utility Transmitter Embodiment Details*

*Example Mobile Base Station Embodiment Details*

*Example GPS Signal Processing Embodiment*

UTILITY LOCATING SYSTEM WITH MOBILE BASE STATION

FIELD

This disclosure relates generally to devices and systems for identifying hidden or buried utilities, such as underground water lines, sewer lines, gas lines, power lines, and the like. More particularly, but not exclusively, the disclosure relates to a mobile base station for use with one or more portable utility locators to aid in determining the location of a particular locator during operation and receive information associated with the utility for storage and/or retransmission to other devices or systems.

BACKGROUND

Utility locating systems, which are used to locate hidden or buried utilities, are well known in the art. A typical utility locating system includes a buried utility locator device, which is a device for receiving electromagnetic emissions, typically magnetic fields, from currents flowing in a utility being located. The utility may be, for example, a buried pipe, such as a water or sewer line, a buried power or data cable, or other hidden or buried conductive objects.

The current flowing in the utility may be inherent currents (e.g., currents flowing in buried power cables), may be induced by radio waves or other electromagnetic fields, or may be coupled to or induced by a device known as a buried utility transmitter (also denoted herein as a "transmitter" for brevity). Buried utility transmitters are devices for generating one or more output current signals for coupling to the utility. The output current signals may be at one or more frequencies or sums of frequencies, one or more amplitudes, one or more duty cycles or having components in certain signal slots, be of one or more waveforms, and/or one or more phases. The phase and/or timing (e.g., slot configuration, on/off timing, etc.) may be synchronized to one or more references. For example, the current flow may be phase synchronized such that a corresponding utility locator has phase or timing information and can process the received magnetic field signal, using the phase or timing information, to extract additional information about the hidden or buried utility.

SUMMARY

This disclosure relates generally to devices and systems for identifying hidden or buried utilities, such as underground water lines, sewer lines, gas lines, power lines, and the like. More particularly, but not exclusively, the disclosure relates to a mobile base station for use with one or more portable utility locators to aid in determining the location of a particular locator during operation and receive information associated with the utility for storage and/or retransmission to other devices or systems.

For example, in one aspect, the disclosure relates to a mobile base station for use in a buried utility locator system. The mobile base station may, for example, include a vehicle, a plurality of antennas disposed on the vehicle including a GPS antenna, a WLAN antenna, a plurality of receivers coupled to corresponding ones of the plurality of antennas, a processing element configured to communicate with ones of the plurality of receivers, one or more utility locators, one or more utility locator transmitters. The base station may further include a power supply subsystem for providing electrical power for the processing elements and plurality of receivers.

In another aspect, the disclosure relates to a utility locating system. The utility locating system may, for example, include a mobile base station. The mobile base station may include a vehicle, a plurality of antennas disposed on the vehicle including a GPS antenna, a WLAN antenna, a plurality of receivers coupled to corresponding ones of the plurality of antennas, a processing element configured to communicate with ones of the plurality of receivers, one or more utility locators, and one or more utility locator transmitters, and a power supply subsystem for providing electrical power for the processing elements and plurality of receivers. The system may further include one or more utility locators configured to communicate with the mobile base station. The system may further include one or more utility locator transmitters configured to communicate with the mobile base station.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 1 is an illustration of one embodiment of a mobile base station system disposed in a truck cap.

FIG. 5 illustrates details of an embodiment of a method for generating enhanced location information in a utility locator.

FIG. 6 illustrates details of an embodiment of a method for generating enhanced location information in a mobile base station and providing correction information to a utility locator.

DETAILED DESCRIPTION

Overview

Figure 2:
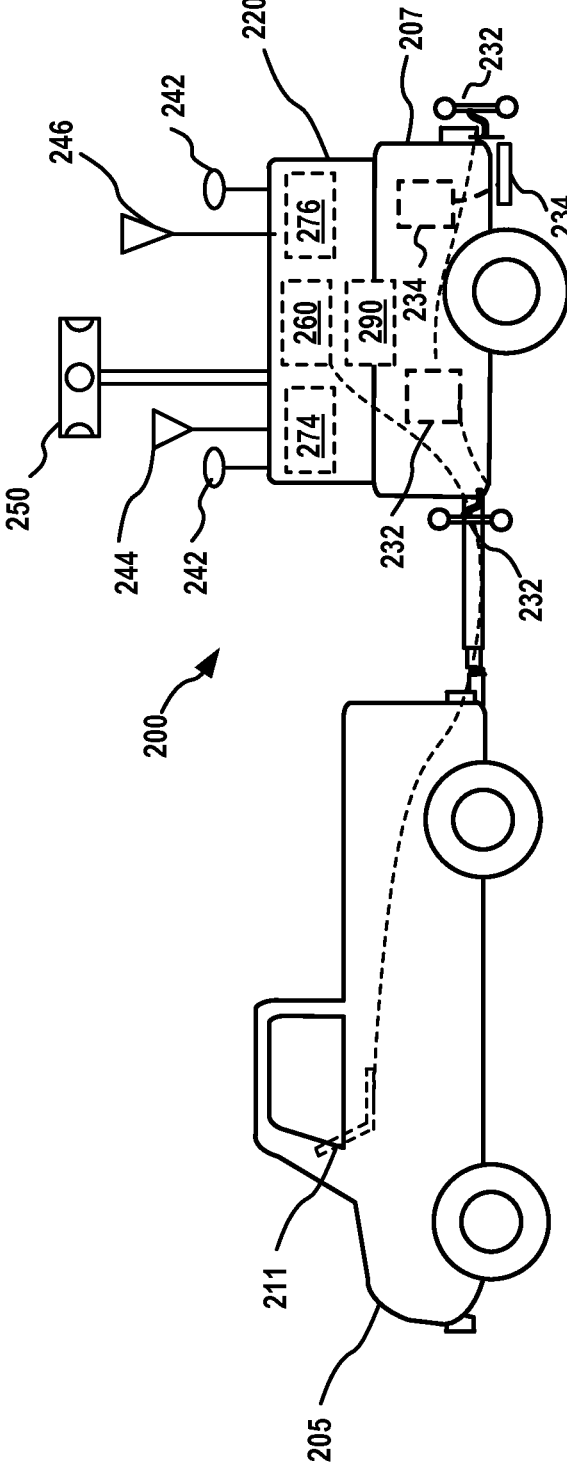
FIG. 2 is an illustration of an alternate embodiment of a mobile base station system disposed in a trailer.

The present disclosure relates generally to devices and systems for identifying hidden or buried utilities, such as underground water lines, sewer lines, gas lines, power lines, and the like. A mobile base station may be used with one or more portable utility locators to determine a reference location and to aid in determining the location of a particular locator during operation, as well as receive information associated with located utilities for storage and/or retransmission to other devices or systems.

For example, in one aspect, the disclosure relates to a mobile base station for use in a buried utility locator system. The mobile base station may, for example, include a vehicle, a plurality of antennas disposed on the vehicle including a GPS antenna, a WLAN antenna, a plurality of receivers coupled to corresponding ones of the plurality of antennas, a processing element configured to communicate with ones of the plurality of receivers, one or more utility locators, one or more utility locator transmitters. The base station may further include a power supply subsystem for providing electrical power for the processing elements and plurality of receivers.

The vehicle may, for example, be a truck with a cap-type structure disposed on a bed of the truck. The antennas may be disposed on the cap-type structure. The plurality of receivers and processing element may be disposed within the cap-type structure or may be coupled to the cap-type structure. The cap-type structure, receivers, and/or processing element are configured to be rollably or slidably removable from the truck.

The base station may, for example, further include a sensor suite comprising one or more of a multi-axis accelerometer, a multi-axis compass sensor, a multi-axis gyroscope, a barometer, a light sensor, and a temperature sensor. The sensors may be coupled to the processing element for providing sensor output data to the processing element and associating the sensor data with data provided to the processing element from the one or more utility locators.

The GPS receiver may, for example, determine information from GPS signals received at the GPS antenna and send the determined information to the one or more utility locators and/or to one or more utility locator transmitters. The determined GPS information may include timing information. The determined information may include positional information associated with a position of the mobile base station. The base station may provide real time kinetic (RTK) data to the one or more utility locators.

In another aspect, the disclosure relates to a utility locating system. The utility locating system may, for example, include a mobile base station. The mobile base station may include a vehicle, a plurality of antennas disposed on the vehicle including a GPS antenna, a WLAN antenna, a plurality of receivers coupled to corresponding ones of the plurality of antennas, a processing element configured to communicate with ones of the plurality of receivers, one or more utility locators, one or more utility locator transmitters, and a power supply subsystem for providing electrical power for the processing elements and plurality of receivers. The system may further include one or more utility locators configured to communicate with the mobile base station. The system may further include one or more utility locator transmitters configured to communicate with the mobile base station.

Various additional aspect, features, and functionality are further described below in conjunction with the appended Drawings.

The disclosures herein may be combined in various embodiments with the disclosures in co-assigned patents and patent applications, including transmitter and locator devices and associated apparatus, systems, and methods, as are described in U.S. Pat. No. 7,009,399, entitled OMNI-DIRECTIONAL SONDE AND LINE LOCATOR, issued Mar. 7, 2006, U.S. Pat. No. 7,443,154, entitled MULTI- SENSOR MAPPING OMNIDIRECTIONAL SONDE AND LINE LOCATOR, issued Oct. 28, 2008, U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009, U.S. Pat. No. 7,288,929, entitled INDUCTIVE CLAMP FOR APPLYING SIGNAL TO BURIED UTILITIES, issued Oct. 30, 2007, U.S. Pat. No. 7,276,910, entitled A COMPACT SELF-TUNED ELECTRICAL RESONATOR FOR BURIED OBJECT LOCATOR APPLICATIONS, issued Oct. 2, 2007, U.S. Pat. No. 7,990,151, entitled TRI_POD BURIED LOCATOR SYSTEM, issued Aug. 2, 2011, U.S. Pat. No. 7,825,647, entitled COMPACT LINE ILLUMINATOR FOR LOCATING BURIED PIPES AND CABLES, issued Nov. 2, 2010, U.S. Pat. Nos. 8,264,226, 7,619,516, entitled SINGLE AND MULTI-TRACE OMNIDIRECTIONAL SONDE AND LINE LOCATORS AND TRANSMITTERS USED THEREWITH, issued Nov. 17, 2009, U.S. Pat. No. 8,264,226, entitled SYSTEM AND METHOD FOR LOCATING BURIED PIPES AND CABLES WITH A MAN PORTABLE LOCATOR AND A TRANSMITTER IN A MESH NETWORK, issued Sep. 11, 2012, U.S. Provisional Patent Application entitled OMNIDIRECTIONAL SONDE AND LINE LOCATOR, issued Mar. 7, 2006, U.S. Pat. No. 8,248,056, entitled A BURIED OBJECT LOCATOR SYSTEM EMPLOYING AUTOMATED VIRTUAL DEPTH EVENT DETECTION AND SIGNALING, issued Aug. 21, 2012, U.S. Provisional Patent Application Ser. No. 61/618, 746, entitled DUAL ANTENNA SYSTEMS WITH VARIABLE POLARIZATION, filed Mar. 31, 2012, U.S. patent application Ser. No. 13/851,951, filed Mar. 27, 2013, entitled DUAL ANTENNA SYSTEMS WITH VARIABLE POLARIZATION, U.S. patent application Ser. No. 13/570, 211, entitled PHASE-SYNCHRONIZED BURIED OBJECT LOCATOR APPARATUS, SYSTEM, AND METHODS, filed Aug. 8, 2012, U.S. patent application Ser. No. 13/469,024, entitled BURIED OBJECT LOCATOR APPARATUS AND SYSTEMS, filed May 10, 2012, U.S. patent application Ser. No. 13/676,989, entitled QUAD-GRADIENT COILS FOR USE IN A LOCATING SYSTEM, filed Nov. 11, 2012, U.S. patent application Ser. No. 13/894,038, filed May 14, 2013, entitled OMNI-INDUCER TRANSMITTING DEVICES AND SYSTEMS, U.S. patent application Ser. No. 13/841,879, filed Mar. 15, 2013, entitled GROUND-TRACKING SYSTEMS AND APPARATUS, U.S. patent application Ser. No. 13/787,711, filed Mar. 6, 2013, entitled DUAL SENSED LOCATING SYSTEMS AND METHODS, U.S. patent application Ser. No. 12/947, 503, entitled IMAGE BASED MAPPING LOCATING SYSTEM, filed Nov. 16, 2010, and U.S. Provisional Patent Application Ser. No. 61/485,078, entitled LOCATOR ANTENNA CONFIGURATION, filed on May 11, 2011. The content of each of these applications is incorporated by reference herein in its entirety (These applications may be collectively denoted herein as the "incorporated applications.").

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

Example Embodiments

Attention is directed to FIG. 1 which illustrates details of an exemplary embodiment 100 of a utility locating system mobile base station (also denoted herein as a "mobile base station" or just "base station" for brevity) in the form of a vehicle including a cap-type structure 120 mounted in the bed of a pickup truck 105 bed as shown, along with associated elements as further described below.

The cap structure may be metallic, plastic, fiberglass, or other materials or combinations of materials and may be shaped to mount in various types of truck beds or may be of a standardized shape and size to provide a universal mount.

Various elements may be mounted on or within the vehicle, such as on the cap structure, or may be electrically or optically coupled to the cap structure. For example, as shown in FIG. 1, various antennas may be mounted on the top (as shown) or sides or within the cap structure in alternate embodiments. Antennas may include one or more GPS antennas 142, which may be coupled to one or more GPS receiver modules (as further illustrated as element 930 of FIG. 9) which may be mounted on or within the cap structure. Additional antennas may include one or more wide area network (WAN) antennas 146 and associated receivers or transceivers 176, as well as one or more wireless local area network (WLAN) antennas 144 and associated transceivers 174. The WAN antennas may be coupled to networks such as cellular data, Wi-Max, or other metro or wide area wireless networks (shown via wireless network hub 370 of FIG. 3), which may be further coupled to the Internet to facilitate data transfer to other Internet-connected server systems and/or databases, such as remote server system 380 of FIG. 3.

Figure 3:
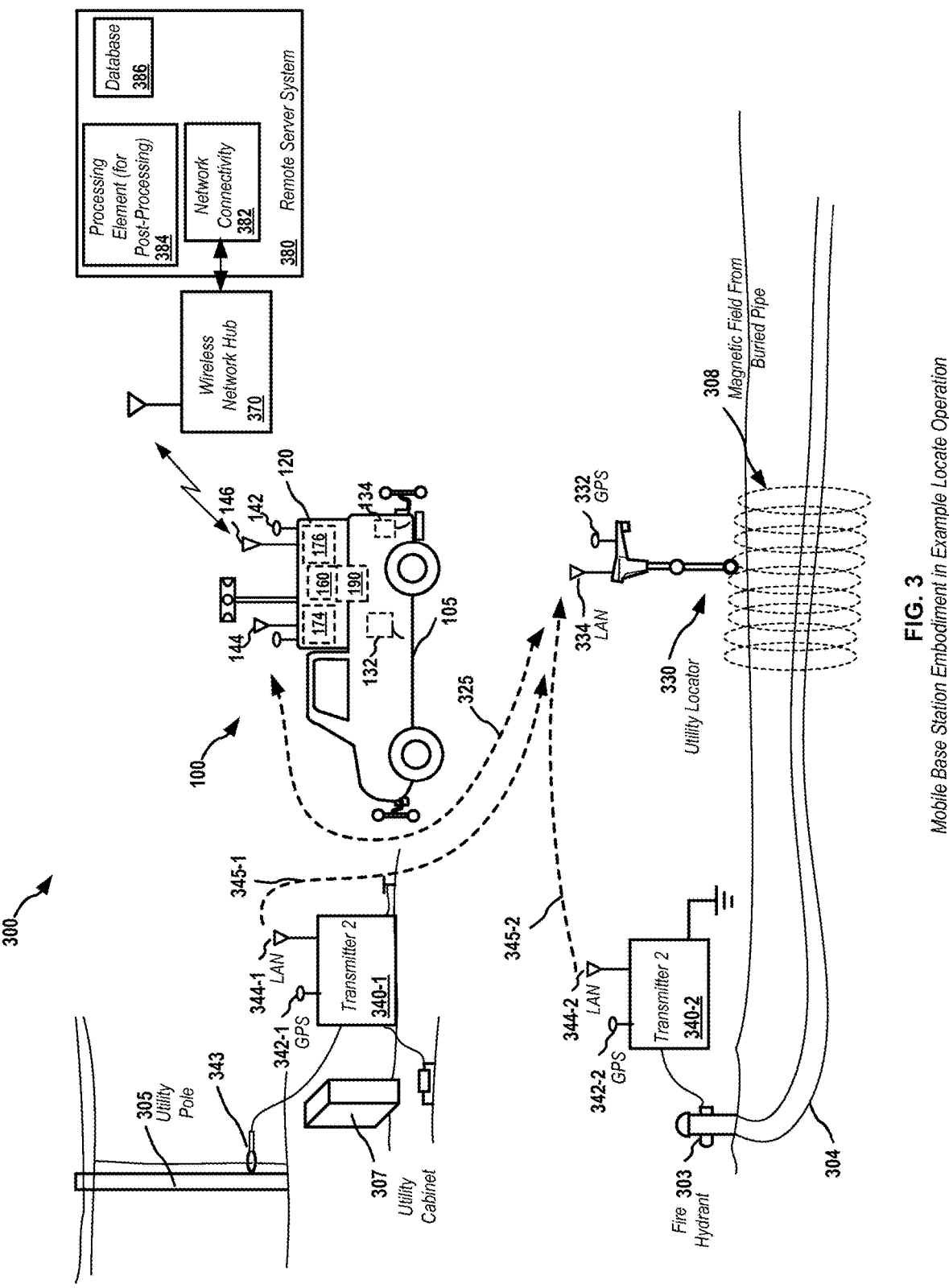
FIG. 3 illustrates details of a mobile base station embodiment in use in an example locating operation where signaling is provided to a utility locator to generate enhanced location information.
Figure 4:
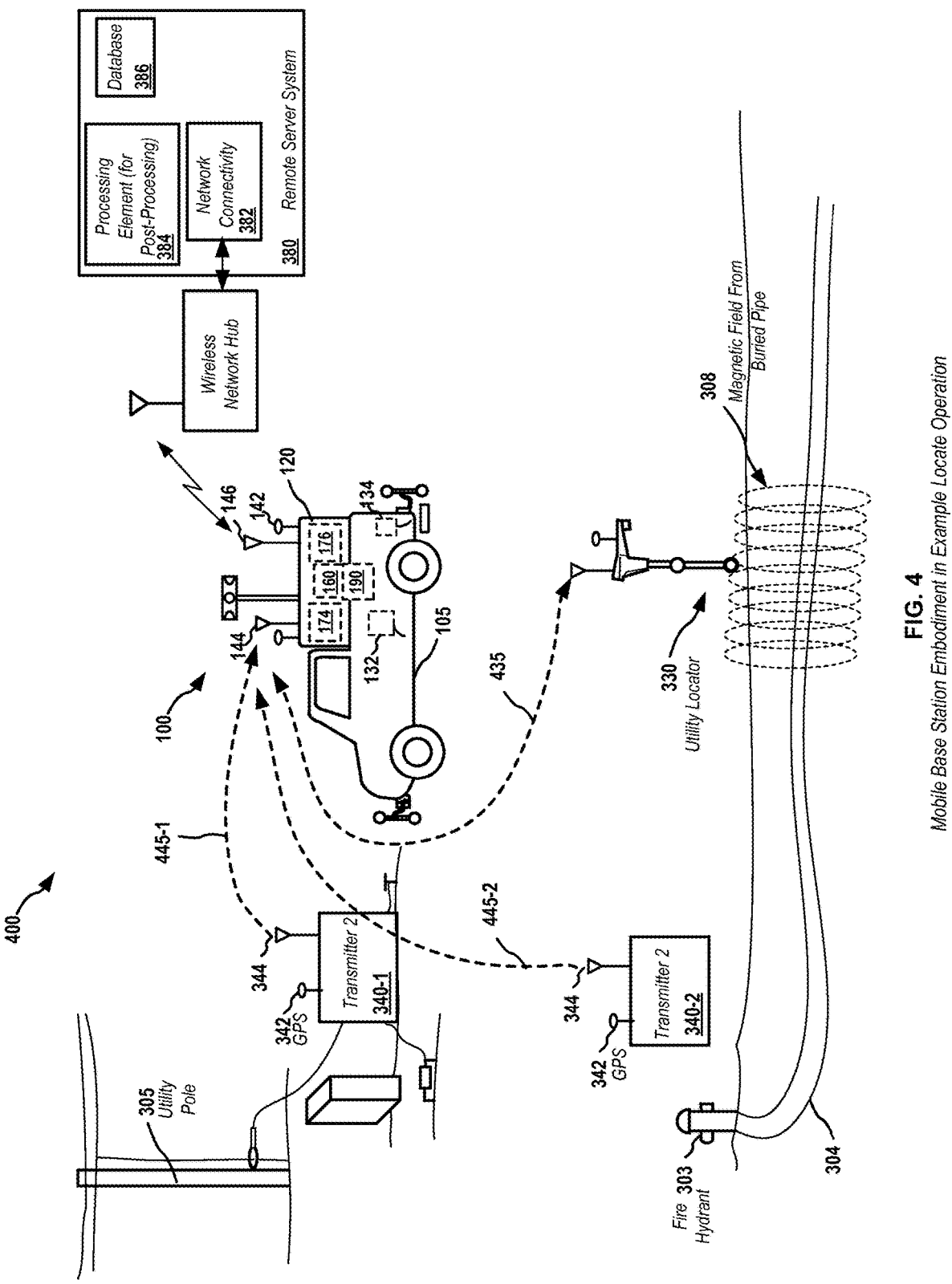
FIG. 4 illustrates details of a mobile base station embodiment in use in an example locating operation where signaling is provided to a mobile base station to generate enhanced location information, which may then be provided to a utility locator to apply corrections to locally generated location information.

Inputs and output from the receivers or transceivers of the various antennas may be coupled to one or more processing elements on or within the mobile base station, such as processing element 160 as shown in FIG. 1. The one or more processing elements may include software and hardware to perform the various control, communication, signal processing, and other functions described subsequently herein, such as processing of GPS signals to determine enhanced location information, generation of correction signals, control of communication between the mobile base station and other system devices such as utility locator (as shown in FIGS. 3 and 4) and transmitters (as shown in FIGS. 3 and 4).

The one or more processing elements may control overall operation of the mobile base station and its various elements as described subsequently herein. The one or more processing elements may include or be coupled to memory or databases to store data such as raw or processed GPS data, detected utility data from the one or more locators, transmitter output signals or control signals, environmental conditions, images or videos, mapping data or information, geographic images, and/or other data or information collected during locate operations. A driver dispatch device 111, such as a notebook, tablet, smart phone, or other electronic computing device may be disposed on or within the truck 105 cab or on or within the cap 120 or mounted elsewhere on the vehicle or mobile base station to allow an operator to communicate with the mobile base station and/or remote server system or dispatcher.

Some embodiments may include an imaging system for capturing images or video in an area where the mobile base station is being used or transported to. This may be done with a camera head 150, which may be an omnidirectional or panoramic camera array or rotating camera system to capture images or video over wide angles or throughout a 360 degree range about the mobile base station. The camera head 150 may be coupled to the processing element and database or other memory storage within the cap 120 to tag the captured images or video with metadata such as time tags, location tags (e.g., based on location information determined through a GPS or other GNSS or terrestrial positioning system or inertial positioning system), locate operation tags with data related to a locate operation being performed, such as operator name, type of utility, customer information, and the like. A camera system including LIDAR or other technologies, such as, for example, a system similar to Google's StreetView camera system, may be used to capture the images, which may then be stored and post-processed to provide a continuous stitched image view of the area where the mobile base station is operating or is transported through.

The mobile base station may include a power supply sub-system 190, which may be disposed on or within the cap 120 and/or associated vehicle 105. Power may be supplied to the mobile base station using various power supply elements such as vehicle power (e.g., from alternators, regenerative power, vehicle batteries, etc.) or through external power such as from a photovoltaic panel 192, a gas or diesel generator (not shown), wind turbine (not shown), additional batteries (not shown), inverters (not shown), fuel cells (not shown), or other power sources that are known or developed in the art.

In some embodiments, cap 120 as shown in FIG. 1 may be configured with slides or rollers to allow the cap and associated elements mounted on or within the cap to roll or slide off the truck bed for use on the ground or other surfaces. This may be useful in applications where a mobile base station needs to be located in a well-defined reference location, or when the mobile base station needs to be used on site for a certain period of time without having the truck out of service.

The mobile base station and/or associated system elements such as locators or transmitters may also include a sensor suite, which may include sensors such as a multi-axis (e.g., three axis) accelerometer, a multi-axis compass sensor, multi-axis gyroscopes or gyroscopic sensors, barometers (for altitude sensing, etc.), light sensors, humidity sensors, temperature sensors, wind sensors, weather sensors (e.g., wind speed, rainfall, temperature, humidity, etc.), received signal strength indicator (RSSI) sensors, Wi-Fi sensors, cellular, or other wireless link sensors, and the like.

Additional elements on the mobile base station may include devices such as ground penetrating radar (GPR) systems 134 (including antennas and associated electronic circuitry modules), electromagnetic locating arrays 132 (including antennas and associated circuitry, which may include one or more locators, such as, for example, four locators on the corners of the mobile base station or truck or trailer to detect buried power lines or other current-carrying utilities under the street or ground on which the truck is operating as shown), sonar systems (not shown), optical sensing systems, and the like.

In operation, one function of the mobile base station may be to determine location information regarding its current location to a high degree of accuracy. This information may then be communicated to a corresponding locator to allow the locator to determine highly accurate relative or absolute location information. High accuracy location information may be done at the mobile base station by, for example, using multiple GPS antennas and receivers and integrating received GPS signals over periods of time to improve accuracy. For example, four spaced-apart GPS antennas, such as antennas 142 as shown in FIG. 1 (or in other configurations, fewer or more antennas, such as, in one embodiment a dual GPS antenna array as described in the incorporated applications), may be used, along with a corresponding receiver or receivers. Other technologies, such as differential GPS, real time kinetic (RTK) terrestrial positioning system signaling (RSSI), terrestrial positioning systems such as are described in, for example, United States Patent Publication 2013/0169484, entitled WIDE AREA POSITIONING SYSTEMS AND METHODS, which is incorporated by reference herein, and the like may be used to obtain precise location information for the mobile base station. Further, in addition to determining location information at a locate site, the mobile base station may be configured to allow the GPS sub-system, typically using multiple spaced-apart antennas, to run continuously during movement of the truck from one site to another to track location and improve positioning accuracy. The mobile base station may also be used, as described subsequently herein, to provide signals to associated utility locators to allow the locators to determine their location, either in relative (with respect to the base station) or absolute terms, with a high degree of accuracy. In some embodiments, multiple wireless link antennas may be used on mobile base station embodiments to use radio direction finding (RDF) techniques to determine positional information.

In addition to providing precision location information, such as in the form of an RTK or RTK-like system, the mobile base station may be in communication with one or more utility locators and/or one or more utility locator transmitters at the locate site, such as through use of a WLAN communication link or other short-range communication link such as an ISM band link, Bluetooth, or other short-range communication links such as optical or ultrasonic links. Examples of such a configuration are shown in further detail in FIG. 3 and FIG. 4. In addition, the mobile base station may be in communication, via a WAN communication link, with remote server systems and databases, such as through cellular networks or other WAN networks and the Internet, to transfer data from the locate operation to a remote server and database. In some embodiments, the mobile base station may include one or more directional antennas to extend the wireless communication range to a locating receiver (e.g., at a particular operating location). The directional antenna may be configured to be set by a user and/or remotely controlled by the user, such as when the user is moving around an extended area, so as to maintain coverage during movement. Directional antennas may be configured to actively point or aim towards a roving locating receiver via mechanical scanning or electronic scanning using phased array or other direction-finding techniques as are known or developed in the art. Directional antenna configurations may also be combined with RDF techniques as described above in some embodiments.

FIG. 2 illustrates details of another embodiment of a mobile base station system 200 in the form of a trailer 207 with a cap 220 mounted on or integral with the trailer. The various elements shown in FIG. 2 may be the same as or similar to equivalently numbered elements of FIG. 1. Similar elements may be included in the trailer cap 220 including one or more GPS antennas 242 and associated GPS receivers (illustrated in further detail in FIG. 9), WAN antennas 246 and associated transceivers 276, WLAN antennas 244 and associated transceivers 274, camera heads 250, GPR systems 234, EM antenna array systems 232, and the like. The trailer 207 may be towed with a pickup truck 205 or other vehicle capable of towing a trailer. The truck and/or mobile base station may include a driver dispatch device 211, such as a tablet, notebook, smart phone, or other electronic computing system, which may be in communication with processing element 260 of the mobile base station in a similar fashion to the configuration shown in FIG. 1. A plug or other connection mechanism may be included on the trailer 207 and truck 205 to connect the dispatch device 211 to the mobile base station 200.

FIG. 3 illustrates details of an embodiment of a location system 300 including a mobile base station 100, such as shown in FIG. 1, in an example locate operation. The illustrated system includes a truck 105 with an attached cap 120 and associated elements as shown in FIG. 1, including one or more processing elements 160 internal to the cap. The mobile base station may include a WAN module with an attached WAN antenna 146 and receiver, transmitter, and/or transceiver 176 for communicating with a wireless network hub 370, such as via a cellular or other wide area network (or, in some implementations, a WLAN, such as a local Wi-Fi network, or via a wired network if wired communication connections are available). A remote server system 380, which may include one or more processing elements 384 to post-process received data from locate operations, as well as a database 386 and a network connectivity module 382, may be coupled to the mobile base station through a network connection, such as through the cellular network and Internet.

Various locate site configurations are possible; however, for purposes of explanation, the following example configuration is provided. As shown in the example site of FIG. 3, there may be a power or telephone pole 305 and a utility cabinet 307, to which a first utility locator transmitter 340-1 may be coupled to generate current for detection by a locator, such as through a clamp 343. Another connection may include a fire hydrant 303 or other pipe terminal where a second transmitter 340-2 may be attached to couple currents so as to induce magnetic fields 308 in an underground pipe 304 electrically coupled to the hydrant. A utility locator 330 is shown sensing the magnetic fields from the buried water pipe 304. The utility locator may be any of a variety of utility locators. In an exemplary embodiment, the utility locator may be a multi-frequency locator as described in, for example, the incorporated applications.

The mobile base station may include multiple GPS antennas, such as, for example, the four spaced-apart antennas as shown in FIG. 1, to provide enhanced GPS location accuracy. In addition, transmitters 340-1 and 340-2, as well as locator 330, may include GPS antennas and receivers (e.g., 342-1, 342-2, and 332) so as to generate data output at the GPS receivers coupled to the antennas. In operation, the mobile base station GPS antennas and receivers may be kept operational or "hot" at all times. In a typical GPS system, accuracy that can be obtained may be in the 2-3 meter range. However, if output data from the GPS receivers is collected and stored, the GPS output data may later be post-processed to improve accuracy, in some cases substantially. GPS provides very accurate time information, which can be used to synchronize data collected from GPS receiver outputs across devices (e.g., the base station, transmitters, locators, and/or other coupled devices). In one exemplary embodiment, the GPS antennas may be configured as described in co-assigned U.S. patent application Ser. No. 13/851,951, filed Mar. 27, 2013, entitled DUAL ANTENNA SYSTEMS WITH VARIABLE POLARIZATION, which is incorporated by reference herein.

In typical applications, it is desirable to have a high accuracy real-time display, on or at the locator 330, of movement (e.g., a high precision system to show that the locator is moving accurately, for example, by 30 cm forward and 30 cm backwards). If the locators and transmitters are configured as multi-frequency locate systems, such as described in, for example, co-assigned U.S. patent application Ser. No. 13/894,038, filed May 14, 2013, entitled OMNI-INDUCER TRANSMITTING DEVICES AND SYSTEMS, and U.S. patent application Ser. No. 13/787,711, filed Mar. 6, 2013, entitled DUAL SENSED LOCATING SYSTEMS AND METHODS, both of which are incorporated by reference herein, substantial data may be collected and associated with precise motion detection. In a typical embodiment, the motion of the locator may be determined in a relative sense, e.g., relative to the mobile base station, which may be at a fixed position and may use multiple GPS antennas to determine position accurately and/or store GPS receiver output data for post-processing later to determine precision location information. GPS receivers alone are unable to determine accuracy to this degree, and will reflect movement in position when the associated device is placed at rest. However, through use of Real Time Kinetic or similar or analogous processing, relative local position information may be dramatically improved.

All of the devices (e.g., transmitters 340, locator 330, and mobile base station 100) shown in FIG. 3 may include a sensor suite, which may include inertial sensors such as three-axis accelerometers, three-axis compass sensors, GPS or other global satellite navigation system (GNSS) receivers, terrestrial positioning system receivers, gyroscopic sensors, and the like. The mobile base station may be configured as a Wi-Fi (or other WLAN) hub, such as via antenna 144 and its associated transceiver (not shown), so that the mobile base station may send position information to the locator (along with, for example, the transmitters, which are typically in a fixed position, also sending information to the locator, where the locator may use its own GPS receiver output, plus the correction information sent by the mobile base station and/or transmitters, to determine enhanced position and/or accurate relative position, relative to the base station and/or transmitters). Systems such as SBAS and others can also be used, however, while SBAS and similar systems provide potentially improved accuracy, they may not be sufficient for typical locate operations.

GPS receivers can provide both binary data and carrier phase information (e.g., for each satellite the receiver is listening to), which may be in the form of Sirf4 binary data (based on one particular IC module) or other similar or equivalent data that includes positional information, satellite information, as well as carrier phase. Examples of available data are described in FIG. 10. Based on device sensors such as accelerometers in the mobile base station and/or transmitters, motion (or lack thereof) may be determined. Moreover, through use of multiple fixed elements (e.g., a mobile base station and one or more transmitters, or through use of multiple mobile base stations), accuracy may also be further enhanced through processing of signals received from each of the fixed position devices. Details of one embodiment of this processing and corresponding modules to generate an RTK solution are illustrated and described subsequently herein with respect to FIG. 10.

Using all of this information, the position of the locator may be accurately determined to, for example, the cm level. This may be done by either processing the data received from one or more fixed elements in the locator directly, or through sending data from the fixed elements to the base station, processing the data in the base station, and then transmitting processed information as a correction signal or as relative or absolute position data to the locator from the mobile base station.

In the example of FIG. 3, all of the elements (transmitters, mobile base station, and locators) may have GPS antennas and receivers running continuously. The devices may be configured so that only the GPS elements are kept running, and there may be a docking power station or other power supply device in the mobile base station or truck to power the devices when not in field use. For example, the transmitters 340 and locator 330 may be stored with the cap 120 and plugged into a power source therein. If the cap is made of an appropriately RF transparent material, the GPS antennas on each of the devices may continue to receive signals when stored inside the cap.

Raw data streams from the GPS receivers (e.g., determined location information and other raw data, including carrier phase, etc.) may be sent from the two transmitters 340-1 and 340-2 and the mobile base station 100, via communication links 345-1, 345-2, and 325, respectively, to the locator 330 as shown in FIG. 3. The locator 330 then receives and processes this data, along with data from its own GPS receiver output, to determine enhanced accuracy location information. This allows displaying both the utility information (e.g., magnetically sensed information as is done in a typical locator), along with accurate location information. The display may include maps, local area imagery, other data or information, or combinations of these. The GPS data may also be stored for later post-processing to increase accuracy. In that case, data may be sent from the locator to the mobile base station, and then may be further transmitted via the wireless network hub 370 to remote server system 380, where it may be post-processed in a processing element 384 and stored in a database 386. The post-processed data may be combined with maps, images, or other information to generate highly accurate maps and graphics showing buried utility information. This information may also be transmitted back to locators for future display use. In some embodiments, GPS compass techniques may be used to accurately determine the orientation of the base station. In some embodiments, offset pairs of GPS antennas and corresponding receivers may also be used on the receiver and/or transmitter to further improve orientation accuracy compared to magnetic compass data.

FIG. 4 illustrates another embodiment of signal transmission and processing in a utility locating system with a mobile base station. In the example of FIG. 4, the transmitters 340-1 and 340-2 send GPS receiver output data, via communication links 445-1 and 445-2, to the mobile base station 100 via receiver antenna 144. Signal processing of the GPS data from the transmitters, along with GPS data from the one or more GPS antennas and/or receivers in the mobile base station, may be done at the mobile base station, with correction data and/or absolute or relative position data then sent via communications link 435 to the locator 330.

In the locator 330, a Kalman filter may be run with the GPS data and inertial or other sensor data to provide further accuracy. With multiple fixed position GPS receivers (e.g., a mobile base station and one or more transmitters), low cost GPS receivers may be used, rather than high cost, high accuracy GPS receivers, which are the standard solution for high accuracy measurements.

In a typical embodiment, data may be collected from the multiple system elements (e.g., one or more transmitters, the mobile base station, and the locator(s)) with the data then sent to the remote server system 380 for post-processing, which may be done later. For example, when the precise ephemeris data is published later (e.g., days or weeks after signal transmission) for the GPS satellites, the data collected from the system elements may be further post-processed to further increase accuracy. CORS station information may also be used to post-process the GPS data in closer to real-time. This post-processing may then be combined with locator data to generate precise mapping information associated with detected buried utilities, with the data stored in the remove server system.

FIG. 5 illustrates details of an embodiment 500 of a process for processing data from multiple GPS receivers to generate enhanced location information in a utility locator. Process 500 may begin at stage 510, where GPS data, including carrier phase information, from one or more utility locating system devices, such as one or more utility locating transmitters, is sent from the devices to a utility locator and received at the locator. The data may be sent by wireless communication links such as Bluetooth, ISM band links, WiFi links, optical links, infrared links, or other local wireless data communication links. In some embodiments, the data may be sent via a wired connection to the locator, however, due to the desired mobility of the locator this is typically not desirable. At stage 520, data from one or more GPS receivers, typically from an array of two or more GPS receivers, including carrier phase information, may similarly be sent from a mobile base station to the utility locator. At stage 530, the received GPS data may be applied, along with locally generated GPS data and/or locally generated sensor data, such as accelerometer, compass sensor, or other local data, to a Kalman filter or other similar or equivalent processing algorithm. Additional inputs may include ground tracking data, such as optical ground tracking techniques as are described in the incorporated applications, including, for example, co-assigned U.S. patent application Ser. No. 13/841,879, filed Mar. 15, 2013, entitled GROUND-TRACKING SYSTEMS AND APPARATUS, which is incorporated by reference herein.

At stage 540, the Kalman filter output, representing either enhanced relative (with respect to the mobile base station) or absolute location information, may be generated as a function of the Kalman filter output and may be stored in a memory and/or transmitted to other utility locate system devices. At stage 550, the location information may be displayed on a display element of the locator, such as on a display screen or other output device. The display may combine location and/or motion information with information associated with one or more detected buried utilities. For example, the location information may be shown on a grid or other reference relative to lines or other symbols representing the detected utilities. Maps, images, or other graphics may be overlaid or registered with respect to the detected utilities using the determined location information.

In some embodiments, map data and/or images corresponding to an area in which a locate operation is being performed may be stored in the locator or in the mobile base station or sent from the remote server system. Maps or images may be rendered on a display of the locator and/or mobile base station or associated device, such as the dispatch device 111 of FIG. 1, and may be dynamically aligned with locator data or information, such as determined locator position and/or information associated with identified buried utilities, ground features, camera images or video, and the like. In locator embodiments including a camera disposed on or coupled to the locator, captured images or video may be associated with the map data, positional data, and/or other locator data or information and may be displayed, stored, transmitted to the mobile base station and/or remote server system, or otherwise processed for future use, display, data mining, aggregation, or mapping use. Camera images or video may be combined with other information as described herein and may be stored, tagged, transmitted, and the like along with the other described data and information. In some embodiments, mobile base station camera systems, such as camera 150 as shown in FIG. 1, may be configured to dynamically track the position of the locator, such as by coordinating with directional antennas as described herein, or by optically tracking the locator using an electromagnetic signal or optical signal. For example, in some embodiments a locator may be configured with an LED or other optical output device that may generate a predefined flash sequence, color, wavelength of output light, brightness, etc. The camera may be configured with a processing element to detect this light output and use it to track the locator and user.

FIG. 6 illustrates details of an embodiment 600 of a method for processing data from multiple GPS receivers to generate enhanced location information at a mobile base station, which may be communicated to an associated utility locator. Process 600 may begin at stage 610, where GPS data, including carrier phase information, from one or more utility locating system devices, such as one or more utility locating transmitters, is sent from the devices to the mobile base station and received at the mobile base station. The data may be sent by wireless communication links such as Bluetooth, ISM band links, WiFi links, or other local wireless data communication links. In some embodiments, the data may be sent via a wired connection to the mobile base station. At stage 620, data from one or more GPS receivers, typically from an array of two or more GPS receivers, including carrier phase information, may similarly be generated at the mobile base station. At stage 630, the received GPS data may be processed along with the locally generated GPS data to determine enhanced accuracy mobile base station location information. This information may be sent directly to a corresponding locator or may be used to generate correction data at stage 640. The correction data may be sent as a correction signal at stage 650 to be used by the locator to correct locally received GPS data so as to provide enhanced relative location or absolute location information. This may be done by, for example, applying the correction data to a locally executed Kalman filter at the locator, where it may be combined with locally generated GPS data and/or other locally generated sensor data, such as accelerometer or compass sensor data. The locator may also send raw GPS data and/or sensor data to the mobile base station, and/or may send corrected relative or absolute location information and/or information associated with detected utilities or other sensed information.

Figure 7:
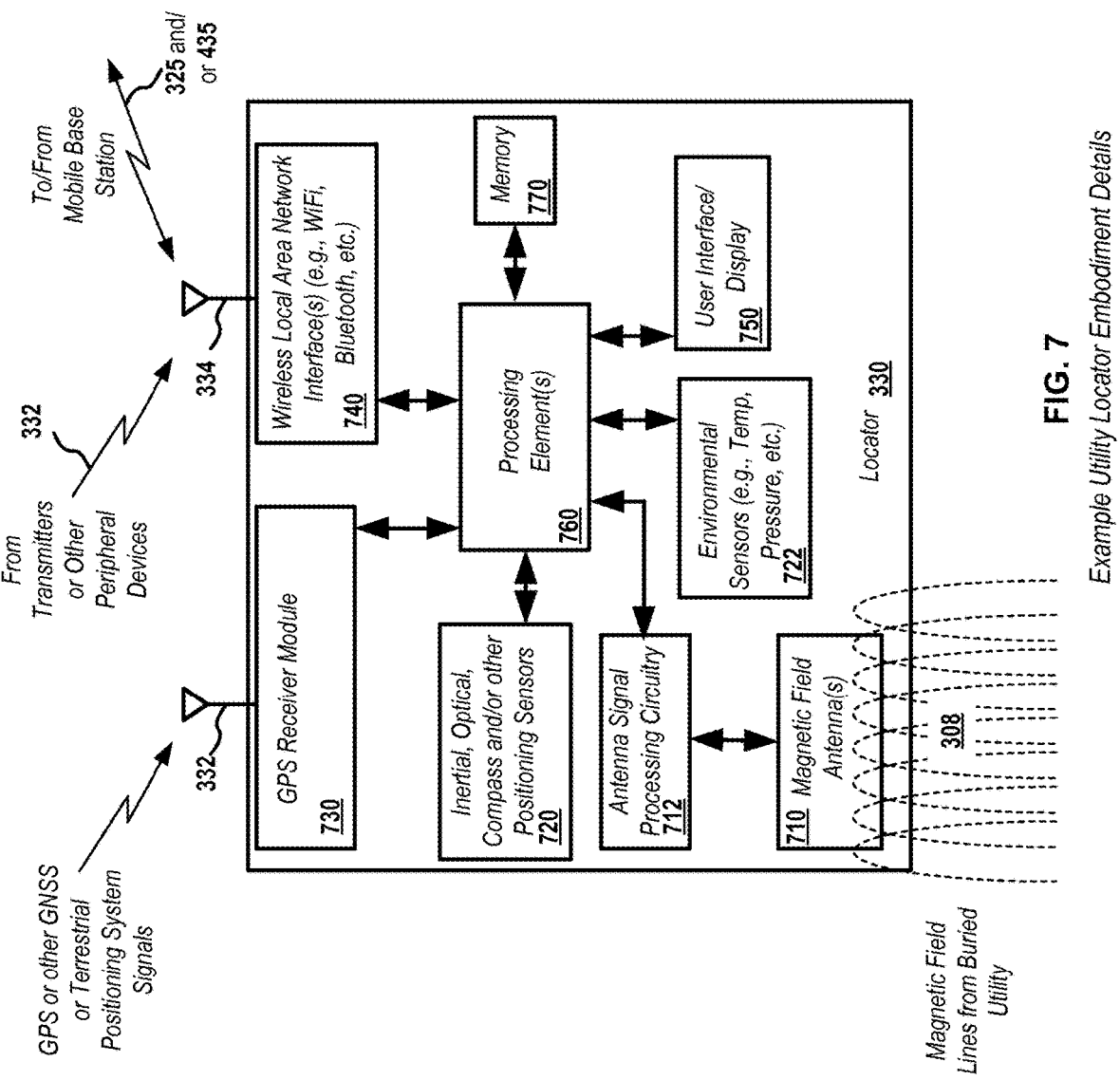
FIG. 7 illustrates certain details of an embodiment of a utility locator.

FIG. 7 illustrates certain details of utility locator embodiment 330 of FIG. 3 or FIG. 4. Various additional details of locators as may be combined with the details of FIG. 7 are detailed in the various incorporated utility locator applications described previously herein. Utility locator embodiment 330 may include magnetic field antennas or antenna arrays 710, which sense magnetic fields from hidden or buried utilities (e.g., as illustrated in FIG. 3 and FIG. 4) and provide antenna output signals to a signal processing circuit 712, which includes analog and digital circuitry to process the received magnetic field signals 308 and determine information associated with the utility, such as depth, orientation, type of utility, other utilities in the area, and the like. One or more processing elements 760 may be included in the locator to provide various control, signal processing, display, communication, and other functions as described herein. One or more memories 770 may be coupled to the processing elements to store executable code and data. The memories 770 may include stored information such as map data, images, video, as well as positional data and information and buried utility data and information. The locator 330 may include one or more user interfaces 750, which may include keys or switches, displays, such as LCD or other output display devices for rendering images, maps, buried utility information, positional information, and/or other data or information as described herein. Additional user interface elements may include audio output devices, microphones, mice or joysticks or other manual user interface devices, headphones or headphone jacks, LED or outer visual output elements, and the like.

The locator 330 may include one or more GPS antennas 332 as well as one or more GPS receiver modules 730, which may provide output GPS data, including positional data and carrier phase data as well as other data as described herein, to the processing element 760 for performing signal processing as described herein to determine accurate positional information. In some embodiments, the GPS data may be sent from the locator 330 to a corresponding mobile base station, where the positional signal processing may be performed (e.g., as shown in FIG. 4). In other embodiments (e.g., as shown in FIG. 3), the locator 330 may directly perform signal processing from received base station signals provided from a mobile base station and/or additional fixed references or base stations such as transmitters 340. Data may be sent from the locator to the mobile base station, and/or received from the mobile base station and/or transmitters, through WLAN antenna 334 and wireless local area network interface module 740, such as via communication links 332, 325, and/or 435 as shown. Additional data may be collected at the locator, such as inertial data, optical data (e.g., optical ground tracking data, etc.), compass or other positioning sensor data, and the like in one or more sensor modules 720. Environmental conditions and/or physical parameters may be collected in one or more environmental sensor modules 722, such as temperature information, pressure information (e.g., barometric pressure, humidity, etc.). Signal processing such as is described with respect to FIG. 10 may be implemented in the locator 330 or in a mobile base station or a remote server system.

Figure 8:
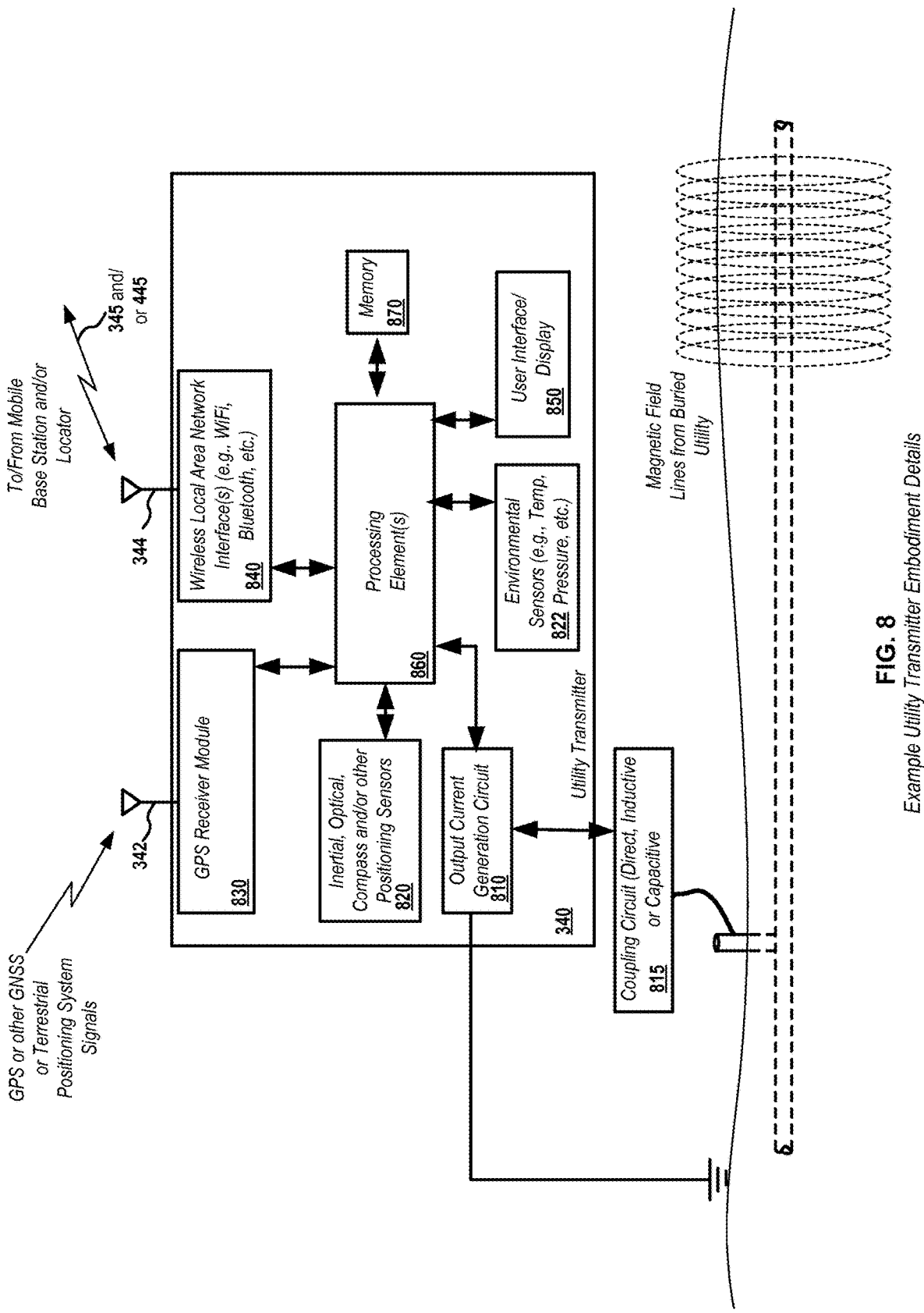
FIG. 8 illustrates certain details of an embodiment of a utility transmitter.

FIG. 8 illustrates certain details of utility transmitter embodiment 340 of FIG. 3 or FIG. 4. Various additional details of transmitters as may be combined with the details of FIG. 8 are detailed in the various incorporated utility transmitter applications described previously herein. Utility transmitter embodiment 340 may include an output current generation circuit 810 and associated coupling circuit 815 (for direct or inductive or capacitive current coupling) to generate current signals to be applied to a buried utility and couple the signals to the utility so as to generate magnetic field lines (e.g., as shown in FIG. 3 and FIG. 4). When the transmitter is in use, it is typically placed at a fixed location, which can be sensed by, for example, onboard sensors. In this condition, the transmitter can function as an additional base station and may send signals to either an associated locator, an associated mobile base station, another transmitter, or combinations of or all of these system elements.

One or more processing elements 860 may be included in the transmitter to provide various control, output current generation, display, communication, positioning signal processing, and other functions as described herein. One or more memories 870 may be coupled to the processing elements to store executable code and data. The memories 870 may include stored information such as data associated with output current signals and signal synchronization, such as time or phase synchronization, which may be communicated with an associated locater via a wired or wireless connection (not shown). The transmitter 340 may include one or more user interfaces 850, which may include keys or switches, displays, such as LCD or other output display devices for displaying information such as output frequencies, signal patterns, current levels, and/or other data or information as described herein. Additional user interface elements may include audio output devices, microphones, mice or joysticks or other manual user interface devices to allow users to enter information into the transmitter, along with visual output elements, audio output elements, and the like.

The transmitter 340 may include one or more GPS antennas 342 as well as one or more GPS receiver modules 830, which may provide output GPS data, including positional data and carrier phase data as well as other data as described herein, to the processing element 860, and for further transmission to associated mobile base stations, locators, and/or other transmitters. In some embodiments, the GPS data may be sent from the transmitter 340 to a corresponding mobile base station, where positional signal processing may be performed (e.g., as shown in FIG. 4). In other embodiments (e.g., as shown in FIG. 3), the transmitter 340 may send signals directly to a corresponding mobile base station. Data may be sent from the transmitter to the mobile base station, and/or received from the mobile base station and/or other transmitters or locators, through WLAN antenna 344 and wireless local area network interface module 840, such as via communication links 345 and/or 445 as shown.

Additional data may be collected at the transmitter, such as inertial data, compass or other positioning sensor data, and the like in one or more sensor modules 820. Environmental conditions and/or physical parameters may be collected in one or more environmental sensor modules 822, such as temperature information, pressure information (e.g., barometric pressure, humidity, etc.). GPS, other sensor, and/or environmental data may be sent from the transmitter to a corresponding locator, mobile base station, or both, where further signal processing, such as described with respect to FIG. 10, may be implemented.

Figure 9:
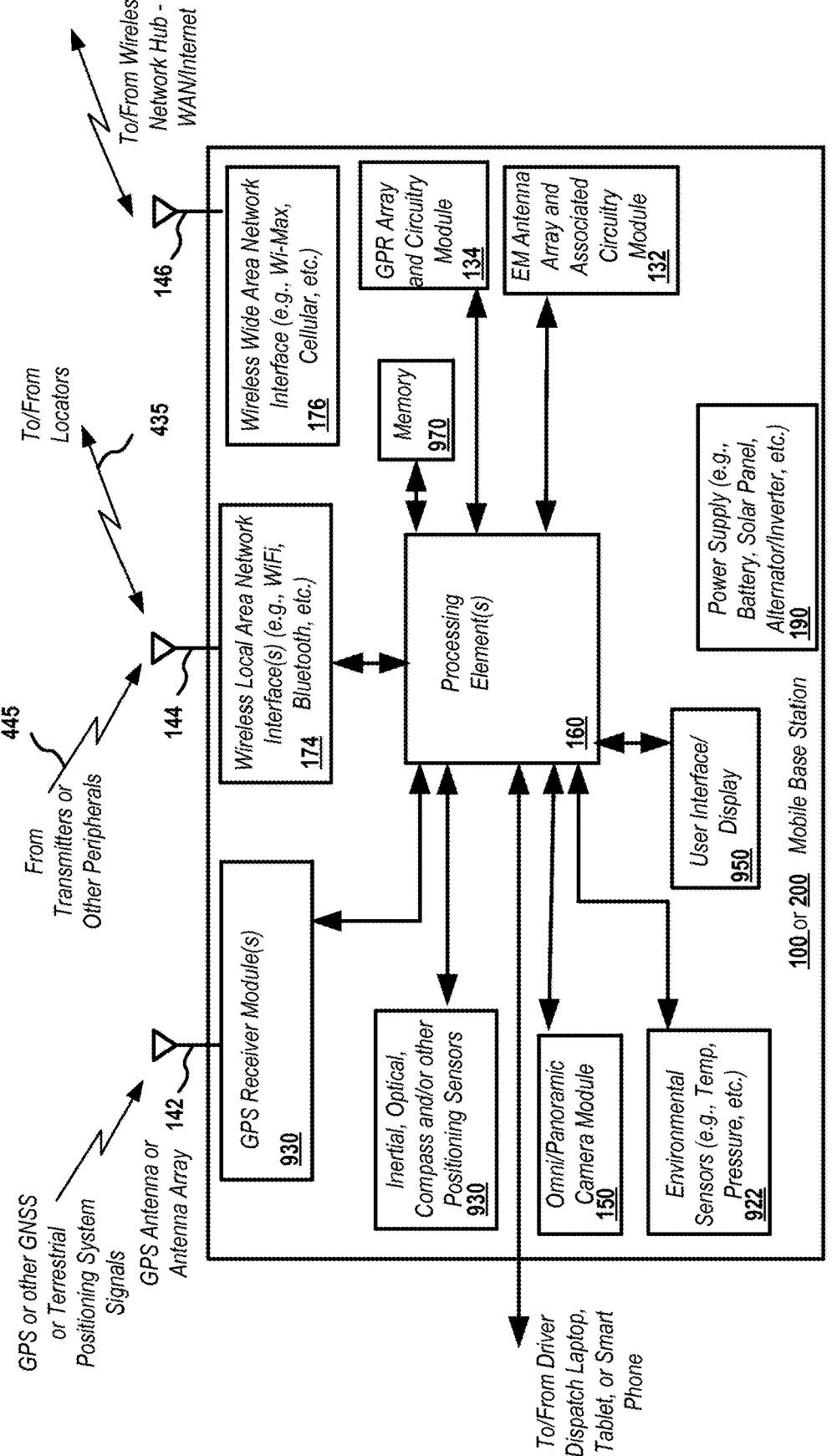
FIG. 9 illustrates certain details of an embodiment of a mobile base station for use with a utility locator and transmitter.

FIG. 9 illustrates certain details of mobile base station embodiment 100 or 200 as described previously herein with respect to FIG. 1 through FIG. 4. Mobile base station embodiment 100 (or 200) may include various input elements as described previously herein, such as one or more camera modules 150 for generating omnidirectional or panoramic images or video, a ground penetrating radar (GRP) array and circuitry 134 for generating radar imagery during movement of the mobile base station or when fixed in position, an electromagnetic field antenna array and associated circuitry 132 for sensing utilities, such as energized power cables, during movement of the mobile base station or when at a fixed location, as well as other elements as described previously herein. A power supply subsystem 190 may be used to power the various elements of the mobile base station and may be any of a variety of power supply elements, such as vehicle or additional batteries, inverters, photovoltaic panels, wind power turbines, fuel cells, generators, alternators, and the like.

One or more processing elements 160 may be included in the mobile base station to provide various control, signal processing, display, communication, and other functions as described herein, including receiving information from associated transmitters and locators and processing positional data to determine accurate positional information, as well as communicating such information or correction signals to corresponding locators. One or more memories 970 may be coupled to the processing elements to store executable code and data. The memories 970 may include stored information such as map data, images, video, as well as positional data and information and buried utility data and information. The pay data, images, and other data may be communicated to a corresponding locator for display, storage, association with utility data, and the like. The mobile base station 100 or 200 may include one or more user interfaces 950, which may include keys or switches, displays, such as LCD or other output display devices for providing user information and receiving user input. Additional user interface elements may include audio output devices, microphones, mice or joysticks or other manual user interface devices, headphones or headphone jacks, LED or outer visual output elements, and the like.

The mobile base station 100 or 200 may include one or more GPS antennas 142 as well as one or more GPS receiver modules 930, which may provide output GPS data, including positional data and carrier phase data as well as other data as described herein, to the processing element 160 for performing signal processing as described herein to determine accurate positional information, or may transmit the output data to a corresponding locator. For example, in some embodiments, the GPS data may be sent from the transmitter 340 to a corresponding locator, where the positional signal processing may be performed (e.g., as shown in FIG. 3). In other embodiments (e.g., as shown in FIG. 4), the locator 330 may send its positional data to the mobile base station where the signal processing may be performed (Additional data from one or more transmitters may also be received and used in the signal processing, such as shown in FIG. 3.). Data may be sent from the mobile base station and/or received at the mobile base station and/or transmitters, through WLAN antenna 144 and wireless local area network interface module 174, such as via communication links 445 and/or 435 as shown. Additional data may be collected at the mobile base station, such as inertial data, optical data (e.g., optical ground tracking data, etc.), compass or other positioning sensor data, and the like in one or more sensor modules 930. Environmental conditions and/or physical parameters may be collected in one or more environmental sensor modules 922, such as temperature information, pressure information (e.g., barometric pressure, humidity, etc.). Signal processing such as is described with respect to FIG. 10 may be implemented in the mobile base station 100 or 200 or in a mobile base station or a remote server system, which may be communicatively coupled through WAN antenna 146 and wireless wide area network interface module 176 as shown.

Figure 10:
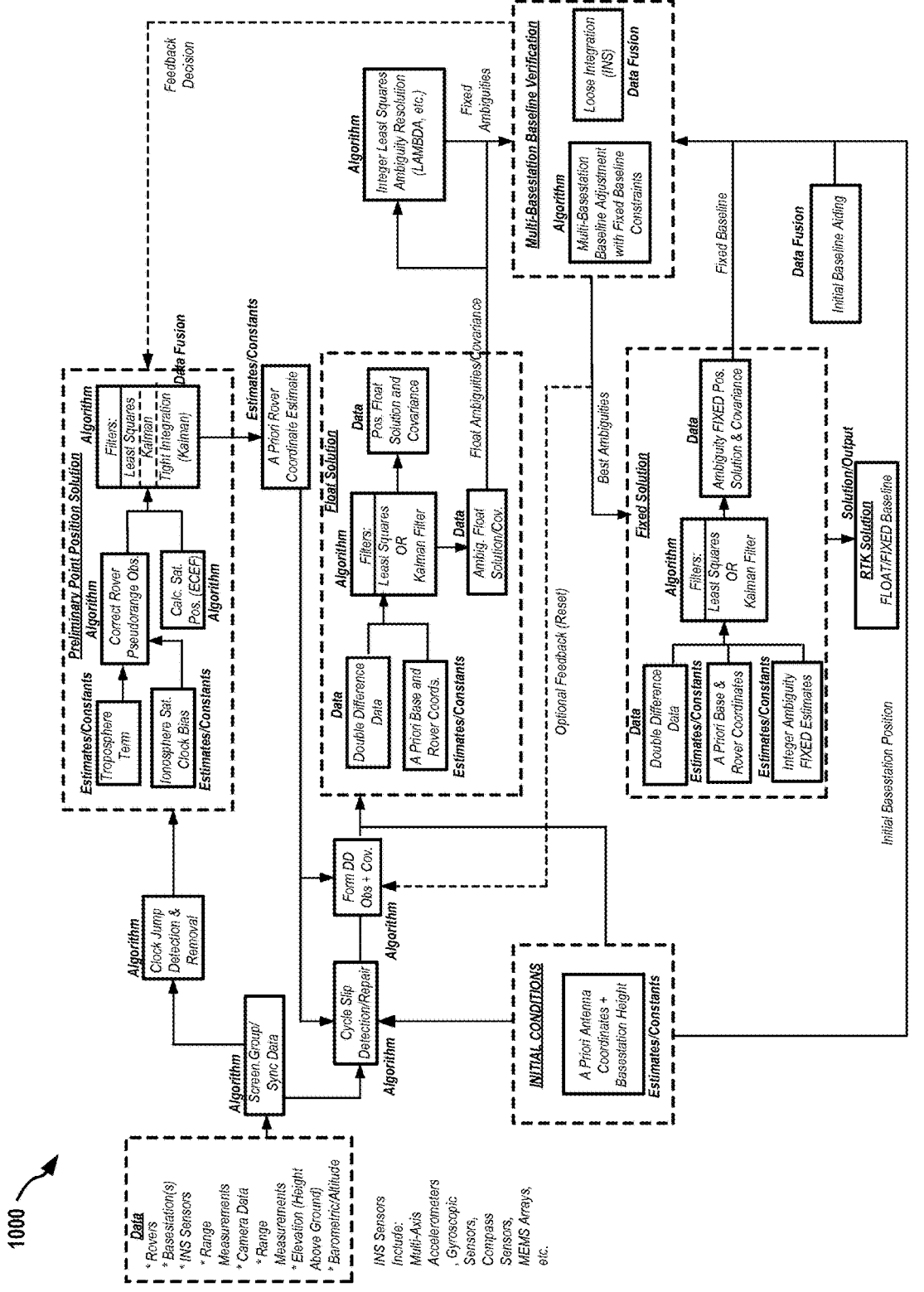
FIG. 10 illustrates certain details of methods and apparatus for processing GPS signals in a utility locator system.

FIG. 10 illustrates details of one embodiment 1000 of a signal processing flowchart as may be used to generate enhanced location information using GPS received output data including carrier phase and other parameters.

Flowchart 1000 highlights several example stages of data processing and algorithms that comprise one embodiment for determining an RTK solution, such as at a mobile base station or, in some embodiments, in a locator or a remote server system or other electronic computing system. The following stages are described in further detail below: Input Data, Screen/Group/Sync, Clock Jump Detection/Repair, Cycle Slip Detection/Repair, Point Positioning Solution, Initial Basestation Position, Formulation of Double Difference Observations/Covariance, RTK Processing (Float Solution, Integer Least Squares Ambiguity Resolution, Fixed Solution), and Multi-Basestation/Inertial Solution Verification. The various illustrated blocks of FIG. 10 represent Data, Estimates/Constants, Algorithms, Data Fusion, or Solutions/Outputs.

Input Data

The input data may be comprised of the following: one or more rover receiver data, one or more basestation receiver data, INS sensor data, range measurement data, and camera data (e.g., for optical ground tracking as described in the incorporated applications). For a real-time implementation of this system, a radio or optical datalink would be necessary between receiver(s)/sensor(s) so data could be exchanged and captured in the processing element(s). Example INS sensor data includes, for example, accelerometer data (e.g., single or multi-axis, such as three axis accelerometer sensors), single or multi-axis gyroscopic sensors, single or multi-axis compass sensors, MEMs sensor arrays, and the like. Multiple data rates may be available/used for these sensors/receivers. Dual frequency data may be collected by each GPS receiver, and multi-polarity antennas could capture different polarized data for groups of receivers.

RTK processing requires data from at least one rover receiver (e.g., a locator or other movable device) and one basestation receiver (e.g., one or more mobile basestations or other fixed position devices such as transmitters, etc.). All other sensor/receiver data is optional for RTK but may be used to further aid the system in more sophisticated methods included in the system below. The starting position may be measured for the receiver/rover (locator) and transmitter (base station) using electromagnetic antennas and compass/gyro/inertial navigation sensors, etc.

Screen/Group/Sync

Multiple requirements may be enforced on the data collected to ensure that only appropriate data is used in the system. Data may be grouped by the specific receiver/sensor platform to which it is associated (i.e. rover or basestation). Another grouping used for some GPS data is to group data by the satellite to which it is associated. Some examples of GPS data requirements are: minimum elevation angle, minimum SNR, and satellite health. Finally, all GPS data sharing identical epochs should be synchronized (between satellites and between receivers) to match each other, and for other sensors their time systems would be converted and interpolated to line up with GPS time or vice versa.

Receiver Clock Jump Detection/Repair

Clock Jump Detection/Repair may be carried out on a per GPS receiver basis as receiver clock jumps are receiver dependent. Clock jumps are step-like jumps that affect both pseudorange and carrier phase measurements collected by GPS receivers. Detection of potential jumps may be carried out for each satellite. Only if all satellites being tracked have jumps of roughly the same amount in pseudorange and carrier phase at exactly the same epochs can a receiver clock jump be fully classified. Monitoring of the estimated receiver clock bias (estimated during point positioning or through some other clock model) may be done to further strengthen identifying receiver clock jumps. Some GPS receivers also report an estimated receiver clock bias directly which may be used as well. Using a clock model to quantify the receiver clock jump is typically best, but it may also be calculated as some weighted average based on the observed jumps in pseudorange and carrier phase in all the satellites being tracked. Once the clock jump is calculated it may then be removed from the pseudorange and carrier phase data at the affected epochs.

Cycle Slip Detection/Repair

Cycle slip detection and repair may only be important if one is using raw Carrier Phase data for receiver positioning (RTK, PPP, etc.), as cycle slips can affect Carrier Phase data. There are several methods for detection and repair of cycle slips which only affect the Carrier Phase data for GPS receivers. Some of these methods are based on multiple time differencing using Carrier Phase and/or Pseudorange and/or Doppler data as well as polynomial curve fitting to estimate the cycle slip amount. These methods require a minimum number of epochs of continuous tracking data in order to initialize so they are usually more suited to post processing. If dual frequency receivers are available there are easier methods that may be used to compute the cycle slips. Also, there are even least squares geometry based techniques that can be used on single frequency GPS data to estimate cycle slips. Another constraint is that the size of each cycle slip must be an integer. Raw Carrier Phase data with cycle slips would have a characteristic jump in the data similar to a receiver clock jump except cycle slips are receiver and satellite dependent because they occur at the tracking loop level.

Initial Basestation Position

RTK systems use one or more stationary basestations from which a relative baseline position(s) is estimated for the rover(s) relative to the basestation(s). The inherent relative baseline accuracy, as well as the absolute accuracy of the rover's RTK position, is highly dependent on the absolute position of the basestation. Depending on whether the system is real-time or post processing there are several options for calculating the basestation's absolute position. Post processing offers the most flexible options, one of which is to average the Point Position solutions for all epochs for that basestation and use that as an initial basestation position, depending on the standard deviation of the time history of the solution. Real-time applications could allow adjustments to the currently used initial basestation positions by considering the current Point Positioning solution for the basestation's absolute position or a moving weighted average of a buffered list of previous Point Positioning solutions.

Point Positioning

Point Positioning is one of the simplest forms of computing a GPS receiver's absolute geodetic position. The basic requirements to compute a Point Position solution are: raw Pseudorange data from four or more satellites, estimated Ionosphere bias, estimated Satellite Orbits, estimated Troposphere bias, and estimated Satellite clock bias. These estimated biases/orbits can be calculated from multiple sources: ephemeris broadcast models (Saastamoinen, Klobuchar, etc.) or even interpolated from precisely generated orbit tables (SP3) or ionosphere tables (IONEX) supplied by the IGS. Interpolating from the precise table data is only an option for post processing. There are several different models that can be used to estimate the Troposphere (UNB3m, UNB, etc.) and Ionosphere biases. The basic outputs from a simple Point Position solution are the receiver's displacement from a user defined origin and the receiver clock bias as well as the covariance matrix associated with these estimated outputs. Not all Point Position solutions are the same; it is the solving of linearized (or nonlinear) equations in which different solution options differ. Some options include: standard least square adjustment, weighted least square adjustment, Kalman filter, extended Kalman filter, and INS aided Tight Integration (Kalman filter based). Some Kalman filter solutions even estimate the Pseudorange biases (such as Ionosphere, Troposphere, etc.) inside of their state vectors. INS aided Tight Integration is a useful verification tool for monitoring the relative agreement between the standalone INS position versus the Point Position solution based on the raw Pseudorange GPS data.

Assumptions for the Above

It is assumed that the baseline between the base station(s) and rover(s) is small (under 20 km). Because of this, many of the errors associated with the observations can be considered to be identical for both the base station(s) and the rover(s). These errors include atmospheric delays and line of sight unit vectors.

Double Differences

The cycle slip corrected observations are then double differenced in preparation for calculating a float solution. To achieve the double difference observations, cycle slip corrected observations are first differenced across satellite pairs, and then those differences are differenced across receiver pairs. This double differencing process removes various error factors from the observations including clock biases and atmospheric delays. Double differenced unit vectors are also calculated using the line of sight angles of azimuth and elevation from the base station to each satellite. After a minimum of two epochs worth of double differenced observations have been made, the covariance of those measurements can be computed, and the float solution can then be generated.

Float Solution

The float solution represents the double differenced number of cycles between each satellite pair and receiver pair. These double differenced numbers of cycles are related to the double differenced observations and the double differenced unit vectors through a well known linearization of the observation model.

The linear system of equations has a set of known values (the double differenced observations), linear coefficients (comprised of double differenced unit vectors), and a set of unknowns which are: the float baseline vector relative to some user defined origin and the double differenced float ambiguities. This float baseline vector gives the relative position of the rover receiver at that epoch relative to some user defined origin, most commonly chosen as the basestation's absolute position. These linear equations may be solved using a variety of methods but the most common are adjusted least squares or Kalman filtering.

Integer Least Squares

The resulting double differenced float ambiguities should theoretically be integers, but due to residual errors and noise, these values will be rational. The float ambiguities will therefore be used in one of two ways: it may be resolved to an integer form to be used in the RTK baseline solution, or it may be used directly for the RTK baseline solution.

In order to resolve the float ambiguities to integers, some form or integer least squares must be used. Either the LAMBDA method or MLAMBDA method are generally recognized as superior integer least squares approaches for RTK applications, though any could be used. These methods are well documented. Any integer least squares approach to be used in this application takes the float ambiguities and their covariances as inputs and produces statistically optimal fixed (integer) ambiguities and their covariances as outputs.

These fixed ambiguities then undergo a verification process to ensure that they are an improvement over the current set of ambiguities, which may either be the float ambiguities or another set of fixed ambiguities that have previously been validated.

This validation process includes multiple processes to ensure that the optimal set of ambiguities is selected for calculating the RTK solution. First, the covariances of the float ambiguities are analyzed to assure that these values have settled to an appropriate level. If the covariances have not settled yet, then the float solution is used while its covariances continue to settle.

Next, the statistically optimal set of fixed ambiguities are compared to the next most optimal set of fixed ambiguities. This process is known as a ratio test for fixed ambiguities. The sum of squared residual errors is computed from each of those sets and if the ratio of those sums is within some defined threshold then this indicates that this set of fixed ambiguities is an improvement on the float ambiguities. If the ratio is outside of the threshold, then the float ambiguities are used.

Once there is an initial estimate of the ambiguities (either fixed or float), an estimate of the baseline between the base station(s) and rover(s) can be calculated.

Fixed Solution

Once the double differenced float ambiguities have been resolved into integers there is a set of double differenced fixed ambiguities. The float baseline vector and its corresponding set of double differenced float ambiguities are coupled. Now that these double differenced float ambiguities have been resolved into integers, a new fixed baseline vector may be solved for using the coupled set of double differenced fixed ambiguities. The fixed baseline vector is all that is unknown at this point, so the dimensionality of the problem has been reduced by the number of double differenced fixed ambiguities there are. The system of equations is a smaller version of those used in the float solution due to there being more known variables and fewer unknown variables. The fixed baseline vector may be solved using a variety of methods similar to the float solution, the most popular of which are adjusted least squares or Kalman filtering.

INS Verification

Loosely integrated INS can also be used as a secondary validation measure. By comparing the change in estimated baselines over time with the change in position solution calculated by the INS, it will be apparent if the present RTK solution has a large drift. If this is the case, the double differences will need to be recalculated (likely using updated satellite geometry) resulting in new float and fixed ambiguities, and a new RTK solution. Any resulting discontinuity in the RTK solution can be mitigated by estimating the position from the INS.

Multibase Verification

Once a fixed solution has been achieved, this result can then be fed back into the verification process in order to further optimize the fixed ambiguities for systems that use more than one base station. For this verification step, the fact that the base stations are static and in a known configuration is leveraged to identify which set of fixed ambiguities is optimal. Since the base station geometry is known and the baselines between each base station(s) and rover(s) have been computed, the difference of the baselines between any rover and each base station should result in the original base station geometry. Errors in the current fixed ambiguities will result in drift in the RTK solution and larger errors will result in larger drift. The amount of drift from the current set of ambiguities can easily be estimated by comparing known base station geometry to the calculated base station geometry from the calculated base lines. If another set of validated fixed ambiguities creates a smaller error in the geometry, then it is selected as the optimal set of ambiguities.

In one or more exemplary embodiments, the functions, methods, and processes described may be implemented in whole or in part in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media The various illustrative functions, modules, and circuits described in connection with the embodiments disclosed herein with respect to positioning and other signal processing functions, control functions, data communication functions, wireless communications functions, and/or other functions described herein may be implemented or performed in one or more processing elements or modules with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The presently claimed invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the disclosure and presently claimed invention. Thus, the invention is not intended to be limited to the aspects shown herein but is to be accorded the widest scope consistent with the appended Claims and their equivalents.

The invention claimed is:

1. A mobile buried utility locating system, comprising:
a vehicle;
one or more buried utility locators;
a plurality of antennas disposed on the vehicle, the antennas including a positioning system antenna for receiving positioning signals for determining positions information of the vehicle and a wireless local area network (WLAN) antenna for receiving and sending radio signals;
a satellite positioning system receiver, operatively coupled to an output of the positioning system antenna, for determining positioning information of the vehicle based on the received positioning signals;
a WLAN antenna and a WLAN transceiver, operatively coupled to an output of the WLAN antenna, for receiving and sending radio signals including data from and to the one or more buried utility locator transceivers and the one or more buried utility locator transmitter transceivers;
a processing element disposed on or mounted to on the vehicle, wherein the processing element is configured to communicate with the one or more positioning system receivers and the WLAN transceiver to process data received from the one or more buried utility locators and one or more buried utility locator transmitters and store positioning data determined in the positioning system receiver in conjunction with the locator and/or transmitter data in a non-transitory memory; and
a power supply subsystem, disposed on or mounted to the vehicle, for providing electrical power for the processing element, positioning system receiver, and WLAN transceiver.

2. The mobile buried utility locating system of claim 1, wherein the vehicle comprises a truck with a cap-type structure disposed on a bed of the truck and the antennas are disposed on an exterior surface of the cap-type structure.

3. The mobile buried utility locating system of claim 2, the satellite positioning system receiver, the WLAN transceiver, and the processing element are disposed within a space enclosed by the cap-type structure.

4. The mobile buried utility locating system of claim 3, wherein the cap-type structure, the satellite positioning system receiver, the WLAN transceiver, and the processing element are mechanically configured to be rollably or slidably removable from the truck.

5. The mobile buried utility locating system of claim 1, further comprising more sensors including a multi-axis accelerometer, a multi-axis compass sensor, a multi-axis gyroscope, a barometer, a light sensor, and a temperature sensor, wherein the one or more sensors are coupled to the processing element for providing sensor output data to the processing element, associating the sensor data with data provided the processing element from the one or more utility locators, and storing the associated sensor data and data provided lo the processing element in a non-transitory memory on the vehicle.

6. The mobile buried utility locating system of claim 1, further comprising a GPS receiver.

7. The mobile buried utility locating system of claim 6, wherein the GPS receiver determines information from GPS signals received at the GPS antenna and sends the determined information to the one or more utility locators.

8. The mobile buried utility locating system of claim 7, wherein the determined GPS information includes timing information.

9. The mobile buried utility locating system of claim 1, wherein the processing element is farther configured to communicate with one or more utility locator transmitters.

10. The mobile buried utility locating system of claim 6, wherein the GPS receiver determines information from GPS signals received at the GPS antenna and sends the determined information to the one or more utility locator transmitters.

11. The mobile buried utility locating system of claim 2, wherein the cap-type structure comprises one or more of metallic material, plastic, fiberglass, or a combination there of.

12. The mobile buried utility locating system of claim 11, wherein the cap-type structure is shaped and sized to mount in one or more truck bed configurations.

13. The mobile buried utility locating system of claim 1, wherein the WLAN is a WiFi system.

14. The mobile buried utility locating system of claim 1, wherein WLAN is a Bluetooth system.

15. The mobile buried utility locating system of claim 6, wherein the GPS receiver is configured to determine positional information from GPS signals received at the GPS antenna and send the determined positional information to the one or more buried utility locators.

16. The mobile buried utility locating system of claim 15, wherein the determined positional information includes timing information.

* * * * *